(12) United States Patent
Ackert et al.

(10) Patent No.: US 7,797,212 B2
(45) Date of Patent: Sep. 14, 2010

(54) REFUND REQUEST TOOL

(75) Inventors: Catherine H Ackert, Seattle, WA (US);
LouAnn Aheron, Charlotte, NC (US);
Michelle Calarco, Charlotte, NC (US);
Glenn Earl Eickenhorst, Charlotte, NC (US); Anahita English, Charlotte, NC (US); Marcus Brian Howell, Charlotte, NC (US); Caroline Beal Stott, Gastonia, NC (US); Deborah M Winick, Carmel, CA (US)

(73) Assignee: Bank of America Corporation, Charlotte, NC (US)

( * ) Notice: Subject to any disclaimer, the term of this patent is extended or adjusted under 35 U.S.C. 154(b) by 682 days.

(21) Appl. No.: 11/554,949

(22) Filed: Oct. 31, 2006

(65) Prior Publication Data

US 2008/0103967 A1    May 1, 2008

(51) Int. Cl.
*G06Q 40/00* (2006.01)
(52) U.S. Cl. ...................................................... 705/35
(58) Field of Classification Search ..................... 705/35
See application file for complete search history.

(56) References Cited

U.S. PATENT DOCUMENTS

2003/0080186 A1   5/2003   McDonald et al.
2003/0208443 A1   11/2003  Mersky
2005/0065872 A1*  3/2005   Moebs et al. ................. 705/38

OTHER PUBLICATIONS http://www.usatoday.com/money/industries/banking/2005-10-04-bank-fees-usat_x.htm Rising bank fees hit consumers, by Kathy Chu.*
http://www.ukbusinessforums.co.uk/forums/showthread.php?t=21679 UK Buiness Forums.*
https://www.usatoday.com/money/industries/banking2005-10-04-bank-fees-usat_x.htm Rising bank fees hit consumers by K. Chu.*
http://www.ukbusinessforums/showthread.php?t=21679 UK Business Forums.*
PCT/US07/83151 International Search Report dated Sep. 10, 2008.

* cited by examiner

*Primary Examiner*—James A Kramer
*Assistant Examiner*—James A Vezeris
(74) *Attorney, Agent, or Firm*—Banner & Witcoff, Ltd.

(57) ABSTRACT

A business may uniformly calculate and offer a fee refund to customers requesting refunds for fees charged to the customers' accounts. Rather than relying on individual employee discretion, a server may use account information and customer information to generate the fee refund amount to be offered to the customer. The calculated refund amount may be based on a variety of considerations including, but not limited to, the amount the account is overdrawn, the profitability of the account, the number of occurrences of charged fees, and/or other factors such as family relationships to other bank customers. Additionally, a fee refund offer may be stored and referred to when the customer subsequently requests a refund.

19 Claims, 6 Drawing Sheets

REFUND REQUEST TOOL

BACKGROUND

Satisfied customers are the key to maintaining and growing a successful business. However, for many transaction-based businesses, and especially for financial institutions such as banks, it is often necessary to charge fees to customers for certain behaviors. For example, if a customer account holder at a bank overdraws his account by writing a bad check, the institution must choose either to cover the account holder for the overdrawn amount, or to return the check to the corresponding bank of the check recipient. In either case, the bank will incur an additional expense, and the economic realities of the business often dictate imposing fees to discourage account holders from such behaviors. These fees are typically called non-sufficient funds or overdrawn (NSF/OD) fees, and are just one of many types of fees that businesses may charge their customers.

On the other hand, all businesses value customer loyalty and longevity, and must do their best to keep and maintain the customers that provide a steady and reliable source of income for the business. Thus, banks and other financial institutions must occasionally bend or break the rules for imposing fees against account holders in the name of customer relations. Typically, these decisions are left to the discretion of the customer service employees of the bank. For example, a bank manager may refer to customer account records or may recall from personal experience that a particular customer is highly valued or more deserving of a fee exemption for an NSF/OD occurrence. When such a customer requests a fee refund for the NSF/OD occurrence, the bank manager is more likely to oblige. Thus, the fee refund policy a business as a whole may be dictated by the combined knowledge and discretion of its front-line customer service personnel.

However, not surprisingly, leaving fee refund decisions up to individual employees often creates inconsistency in the overall refund policy of a business. For example, even though bank managers and customer service personnel may be trained to allow refunds in certain circumstances and deny them in others, this conventional solution has several shortcomings. First, training employees to properly understand and execute the bank's refund policy may impose a substantial cost on the bank. Second, front-line bank employees might not always have immediate access to all of the relevant information for the account and customer requesting the refund, making it difficult for the employee to make the appropriate refund decision. For example, it may be desirable to allow a fee refund based not only on the customer's banking history, but also on the banking history of the customer's immediate family, which a bank employee might not have the time or resources to discover. Bank employees using their own discretion may also be more sympathetic and likely to offer more refunds and higher refunds than is dictated by the bank's policy. Additionally, relying on employee discretion for offering fee refunds to customers often results in so-called "refund shopping." A customer that is denied a fee refund at one bank branch may simply drive over to a different bank branch in the hope of finding a more sympathetic employee. The lack of uniformity and consistency in offering fee refunds can waste the resources of the bank and undermine the bank's overall fee refund policy.

Accordingly, there remains a need for systems and methods for offering fee refunds to customers at financial institutions and other businesses.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one aspect of the present disclosure, a computer server is implemented to calculate and output fee refund suggestions. The server first receives a refund request initiated by a customer seeking a refund for an account fee, such as an NSF/OD fee charged to a banking customer. The server retrieves relevant information about the charged account and about the customer requesting the refund, for example, from a centralized company-wide database accessible from different terminals at different physical locations. The account information may include, for example, the amount by which the account was overdrawn, the profitability of the account, the account tenure, and prior fees and refunds associated with the account. The customer information may include, for example, the number of accounts held by the customer and a customer relationship type. Based on the account information and customer information, the server may calculate and output a refund amount that may be used to offer a fee refund to the customer.

According to another aspect of the present invention, the customer relationship information may be based not only on the individual customer, but also on other external factors, such as the personal relatives of the customers who are also account holders at the bank. According to yet another aspect of the present invention, the calculated refund amount may be stored on the server along with a time and location that the customer requested the refund. When the customer subsequently requests a refund for the same fee at a different time or location, the server may retrieve the record of the previous fee refund request and use this information as part of the basis to determine the next refund offer.

BRIEF DESCRIPTION OF THE DRAWINGS

Figure 1:
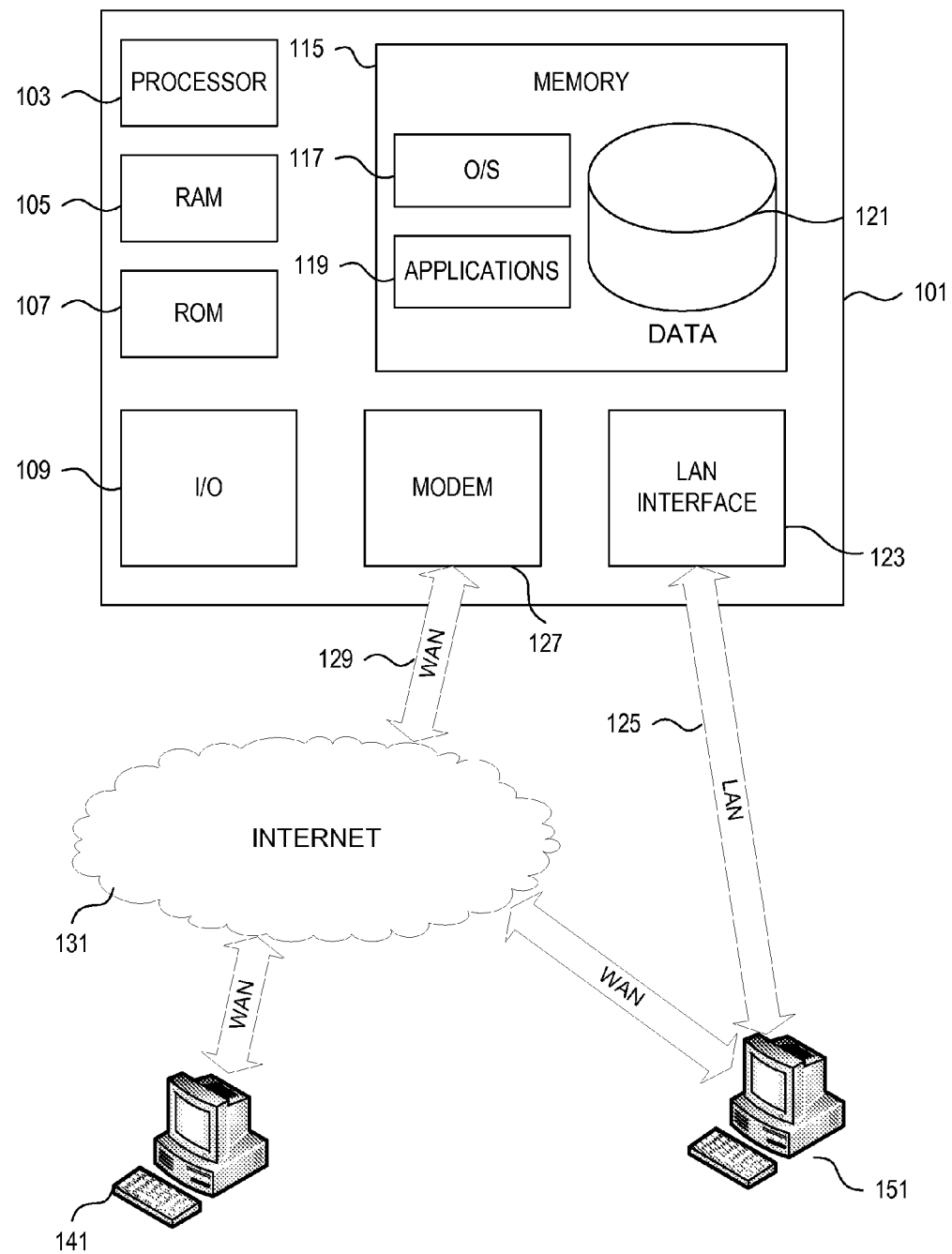
Figure 2:
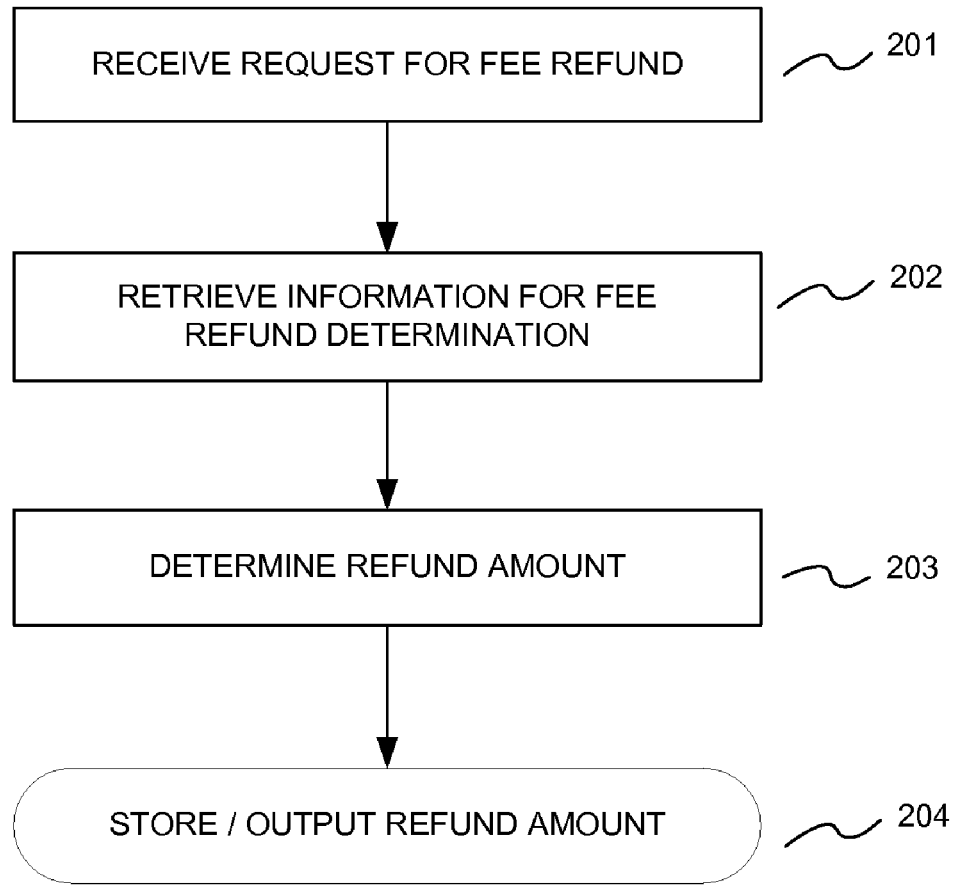

Having thus described the invention in general terms, reference will now be made to the accompanying drawings, which are not necessarily drawn to scale, and wherein:

FIG. 1 is a block diagram illustrating a computing device, in accordance with aspects of the present invention;

FIG. 2 is a flow diagram showing illustrative steps for receiving and processing a fee refund request, in accordance with aspects of the present invention; and FIGS. 3A-3D are flow diagrams showing illustrative steps for processing a fee refund request by taking into account a variety of account and customer information to make a refund determination, in accordance with aspects of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as branch terminals 141 and 151. The branch terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Terminals 141 or 151 may also be mobile terminals including various other components, such as a battery, speaker, and antennas (not shown). I/O 109 may include a user interface including such physical components as a voice interface, one or more arrow keys, joy-stick, data glove, mouse, roller ball, touch screen, or the like.

Although the illustrative techniques described below frequently refer to refunding fees in a banking context, such as non-sufficient funds/overdrawn account (NSF/OD) fees, it should be noted that the present invention is not limit to one particular type of fee or even one particular type of business. The inventive concepts used to calculate and provide the fee refund may apply to virtually any type of fee charged to a customer in any business. Thus, for illustrative purposes only, in the context of a banking business, Table 1 contains a list of banking fees that might be charged to an account holder.

TABLE 1

| Typical Banking Fees Fee Description | |
|---|---|
| Account Inquiry Fee | Monthly Service Charge |
| Account Research Fee | NSF/OD Fee |
| Annual Check Card Fee | Overdraft Protection Fee |
| ATM Denial Fee | Online Banking Fee |
| Bank of America ATM Fee | Photo Copy/Copy Fee |
| Check Order Fee | Returned Item Fee |
| Non-Bank of America ATM Fee | Safe Deposit Box Rental Fee |
| International ATM Fee | Stop Payment Fee |
| International Check Card Fee | Wire Transfer Fee |
| Legal Fees | |

Referring to FIG. 2, a flow diagram is shown illustrating a fee refund process, in accordance with aspects of the present invention. In step 201, a fee refund request is received at the server 101. In the personal banking context, the step may be initiated by a customer requesting a refund from a bank employee. The bank employee may use a computer terminal 141 at the bank branch to communicate the request to the server 101, which may be a centralized database server accessible to terminals from each of the different bank branches. Specifically, the bank branch terminals 141 and 151 may have a client software application (e.g., a web-based application or console application) installed which initiates a connection to the central server 101 over the Internet 131. The branch terminals 141 and 151 may then communicate the relevant information to the central server 101, such as the account number or account holder name and information identifying the fee for which the customer has requested a refund.

Thus, in this example, the refund determination described in detail below is performed primarily at the central server 101. However, it should be noted that in other embodiments, the branch terminals 141 and 151 may perform some or all of the processing for determining the refund amount. For example, a branch terminal 141 might store account information and account holder information locally, and thus might never need to contact the central server 101. Alternatively, the branch terminal 141 may issue a database query to retrieve the precise account information and account holder information from the database 121, then perform the calculations for the refund determination without further assistance from the server 101. Many other techniques are commonly known for providing functionality at a client terminal 141 using data stored at a central server 101, involving various delegations of responsibility between the client computer 141, server computer 101, and intermediate network computers 131.

Returning the illustrative flow diagram of FIG. 2, in step 202, having received the fee refund request, the central server 101 may begin the process of determining a refund amount by retrieving the relevant information to be used in the fee refund determination from the database 121. Of course, the relevant information for the refund determination may depend on the type of business and the type of fee charged, and may include various fee-specific information, such as account information, customer/account holder information, related customer data, and other data stored in the database 121. In other words, each different type of fee may have its own unique predetermined rule(s) that are implemented and executed by the refund software application on the server 101. As described in detail below with reference to the flow diagrams in FIGS. 3A-3D, each predetermined fee refund rule may include a different set of logical steps depending on the fee that has been charged and on policy decisions made by the business with respect to that type of fee.

For example, when making fee refund determinations in a banking context (e.g., for an NSF/OD fee), step 202 may include retrieval of a customer relationship type. The customer relationship type might simply be a field in a bank account holder database table, providing a quantified measurement of how valuable that customer is to the institution. For example, a bank might assign each bank customer to one of the following customer relationship types: Private, Plus, Prime, Premier, or Business. A Business customer relationship type might indicate that the account is owned by a business entity (e.g., partnership or corporation). The other customer relationship types might be assigned to individual account holders based on their account type, initial account balance, how long they have been a customer at the bank, or other factors such as relationships with other bank customers. For example, a first-time customer opening a new account might be automatically designated a Plus customer, rather than the typical Private designation for first-time customers, after the information server 101 queries the database 121 and learns that another customer with the same last name residing at the same address is a Premier account holder. Customer relationship types may be stored in the database 121 as an attribute of the customer (e.g., human customer or business entity), an attribute of the account, or an attribute of the customer-account combination. Thus, it is possible that for an account held jointly by two customers, a different refund might be offered to one customer requesting a refund for a NSF/OD fee on the account than to the other customer requesting a refund for the same NSF/OD fee on the same account. For existing customers, customer relationship types might be periodically updated based on automatic criteria (e.g., customer longevity), or may be updated at the discretion of a bank employee. As mentioned above, the customer relation type may be a data field persisting in the database 121 of the server 101. Alternatively, customer relation type might not be persisted in the database but may instead be generated on the fly from other relevant information stored in the server 101.

In certain implementations, the customer relationship type retrieved in step 202 might be enough by itself to determine the suggested refund amount to be offered to the customer. For example, a low-level customer type (e.g., for new bank customers or for probationary customers) might indicate that regardless of any account information or the circumstances of the fee, no fee refund should be offered to the customer. However, in many fee refund scenarios, additional data is retrieved in step 202 and used to determine the refund amount to be offered. In the example of the NSF/OD fee, several pieces of account information corresponding to the account charged with the fee are also retrieved from the database 121 on the server 101. The account information retrieved may include, for example and without limitation, any one or more of the following: the current account balance (i.e., the amount overdrawn in the case of an NSF/OD fee), the account tenure (i.e., amount of time since the account was first opened), the profitability of the account, the number of different accounts that the customer has at the bank, the number of times that the customer has incurred a NSF/OD fee, the number of days that the customer's account has remained overdrawn for that NSF/OD occurrences or other previous fee occurrences, and any past fee refunds or exemptions that the customer has received. FIGS. 3A-3D describe more specific examples of the account information and account holder information that may be retrieved in step 202.

In step 203, the server 101 uses the information retrieved in step 202 (e.g., the customer relationship type and the account information) to calculate a fee refund to be offered to the customer. In this example, since the refund determination takes place at the centralized server 101, rather than based on the individual discretion of customer service employees as in convention systems, the business may implement and easily modify a uniform refund policy. Numerous advantages result from the flexibility and uniformity of such a system. For example, if a new customer retention study indicates that 75% fee refunds do not significantly satisfy banking customers any more than 50% fee refunds, then the bank may wish to adopt a new fee refund policy of refunding only 50% of NSF/OD fees in each previous circumstance where a 75% fee refund had been given. As another example, a bank may wish to gain a market advantage over competitors by advertising and implementing a new "First Time Offender" program that offers full NSF/OD fee refunds to banking customers for the first violation occurrence. In both of these examples, rather than needing to distribute the new policy information to each branch and/or re-train the bank personnel to offer the correct refund amount, the policy change may be quickly implemented on a company-wide scale by altering the fee refund algorithm in the software application executing at the central server 101. The flexibility of this fee refund system also allows businesses to frequently change their refund policies so that they may temporarily experiment with different policies and select the most effective policy for their businesses based on empirical data.

Finally, in step 204, the fee refund amount is stored and/or output back to the customer. In this example, the server 101 may transmit the suggested refund amount to the branch terminal 141, for example, as a refund dollar amount or as a refund percentage. The customer service employee at the branch may then convey the refund offer to the customer. Of course, as a matter of company policy, certain businesses may still permit their individual employees to override the refund recommendation of the system and alter the refund amount offered to the customer.

As indicated above, step 204 may also involve storing the refund amount offered to the customer in the central database 121. The refund software application running on the server 101 may directly store the suggested refund amount in the database 121 at the same time that amount is communicated to the branch terminal 141. Additionally, when an employee is permitted and does exercise discretion in offering fee refunds, the employee might also input the amount actually offered to the customer into the branch terminal 141, so that this amount may be uploaded back to the server 101 and stored in the database 121. By storing the amount of the refund offered, and whether or not the refund offer was accepted by the customer, the business may prevent customers from so-called "refund shopping." For example, if a customer is offered a 25% refund for a NSF/OD fee at one branch and declines it, then goes to a second branch to ask for a refund for the same NSF/OD fee, the system may ensure that he will not be offered any more than 25%. First, since the refund amount is determined in accordance with the common algorithm executed at the central server 101, the refund offer computed for the second request will likely be the same amount first refund offer. Secondly, if the server 101 stores the fact that a 25% refund was previously offered to the customer for this NSF/OD fee, then the server 101 might not even need to perform a second calculation. Rather, the server 101 may simply retrieve the amount of the previous refund offer and forward that to the second branch terminal 151. The server 101 may also forward an indication to the second branch terminal 151 to inform the bank employee that this customer has previously requested a refund for this fee, allowing the bank employee to handle the situation appropriately. For example, if a customer refuses a refund initially offered, the bank employee may process the refusal as the distribution of a $0.00 refund. Thus, for subsequent refund requests, the server 101 may treat the occurrence as having already having distributed a refund, and might not allow this refund to be decisioned again. Instead, the server 101 may simply transmit a message corresponding to the "No Refund Available" to the bank employee at the second branch terminal 151, indicating that no refund, not even the previously-offered refund amount, should be offered to the customer. Alternatively, the server 101 may be configured to store and re-offer the same previously offered refund amount to customer, which may similarly happen without needing to re-decision the refund request through the logical steps of FIG. 2.

In FIGS. 3A-3D, a flow diagram is shown describing a specific implementation of an illustrative algorithm for providing a fee refund to a customer. This example involves refunds for NSF/OD fees for banking customers designated by one of the following customer relationship types: Private, Plus, Prime, Premier, and Business. The logical steps performed in FIGS. 3A-3D generally correspond to the specific fee refund rule (i.e., the refund determination step 203 in FIG. 2) for the NSF/OD fee. However, it should be understood that the predetermined fee refund rules and corresponding logical steps may be different for different fee types. Thus, a fee refund determination for another type of fee (e.g., an ATM Denial fee) may retrieve different relevant data and may follow a rule with a different set of logical steps from those of the NSF/OD fee refund rule described in the flow diagrams of FIGS. 3A-3D.

In step 301, the bank customer requests a refund for an NSF/OD fee that has been charged to the customer's bank account. As described above, step 301 may be initiated by a customer requesting the refund in person to a bank employee at a branch location. Alternatively, in certain implementations, a customer may request a refund by directly communicating with the central server 101, for example, by accessing the bank's personal banking web site that supports automatic refund requests directly from customers over the Internet 131. Thus, the customer may have the freedom to request and obtain a fee refund from any Internet-accessible terminal. Of course, in other implementations, intervention by an associate (e.g., bank employee) may be required for handling refunds, so customer access to a refund request system might be restricted to a business center (e.g., bank branch location) or via a telephone customer service center.

In step 302, the daily ending balance of the account is examined for the day corresponding to the NSF/OD occurrence. If the daily ending balance is less than $0.00 but more than a nominal threshold amount (for example, −$3.00), meaning the account was overdrawn by less than three dollars, and then the entire fee is refunded to the customer in step 303. Thus, in this example, customers who write a bad check or overdraw their accounts by such a narrow margin, the institution will not enforce the fee against customers requesting refunds in such circumstances.

In step 304, the account information retrieved from the database 121 is used to determine the number of days that the customer's account has been in an overdrawn state in the last year. If the account was in an overdrawn state for only a minimal amount of time (for example, one day) in the last year, then control proceeds to step 305 on FIG. 3B. If the account was overdrawn for a few days (for example, 2-4 days) in the last year, then control proceeds to step 308 on FIG. 3C. If the account was overdrawn for more than several days (for example, 5 or more days) in the last year then control proceeds to step 324 on FIG. 3D. Thus, the institution may refund more NSF/OD fees to customers whose accounts are rarely overdrawn and customers that quickly correct NSF/OD occurrences.

Figure 3A:
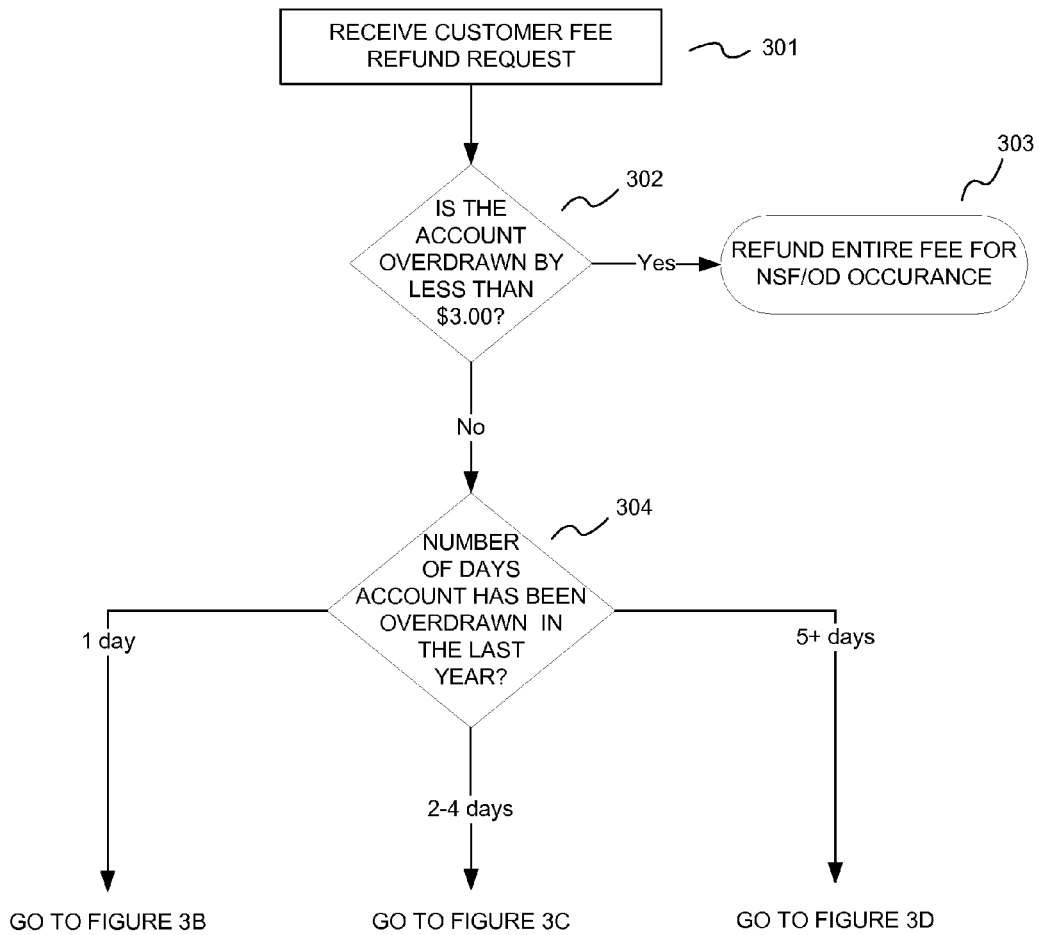
Figure 3B:
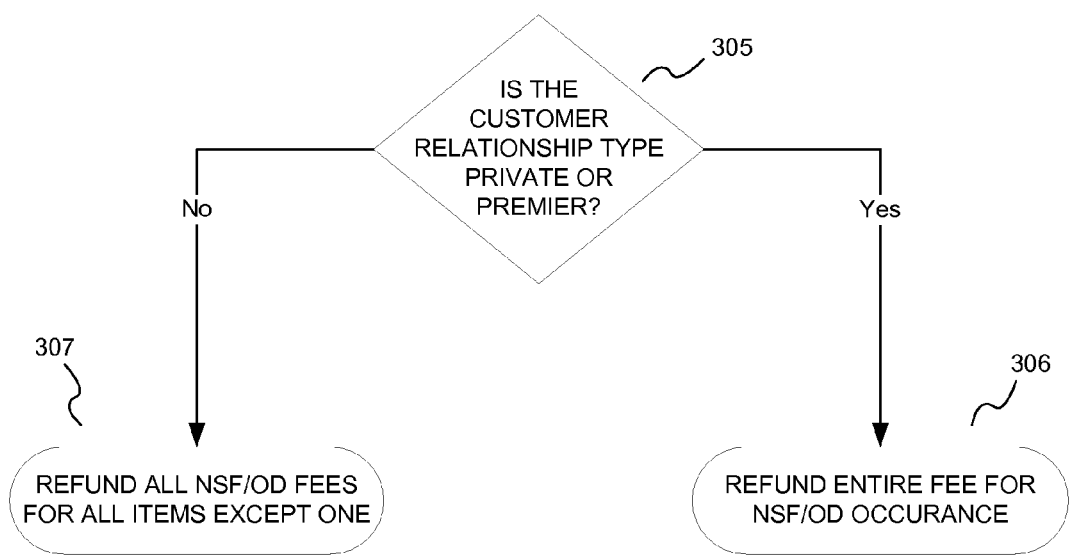

Referring to FIG. 3B, the refund software application executing on the server 101 has determined at this point that the customer's account was in an overdrawn state for a minimal amount of time (e.g., one day) in the last year, although it was overdrawn for an amount greater than the nominal threshold amount (e.g., three dollars). In step 305, if the system considers the customer relationship. For example, if the customer has a customer relationship type of Private or Premier (305: Yes), then the entire NSF/OD fee is refunded to the customer in step 306. If the customer has a customer relationship type of Plus, Prime, or Business, then all NSF/OD fees are refunded to the customer except one in step 307. That is, if the account is overdrawn and multiple items have attempted to post to the account on the same night, then in step 307, the customer might only be required to pay one NSF/OD fee, rather than paying a fee for each item that posted or attempted to post to the account on that night.

Figure 3C:
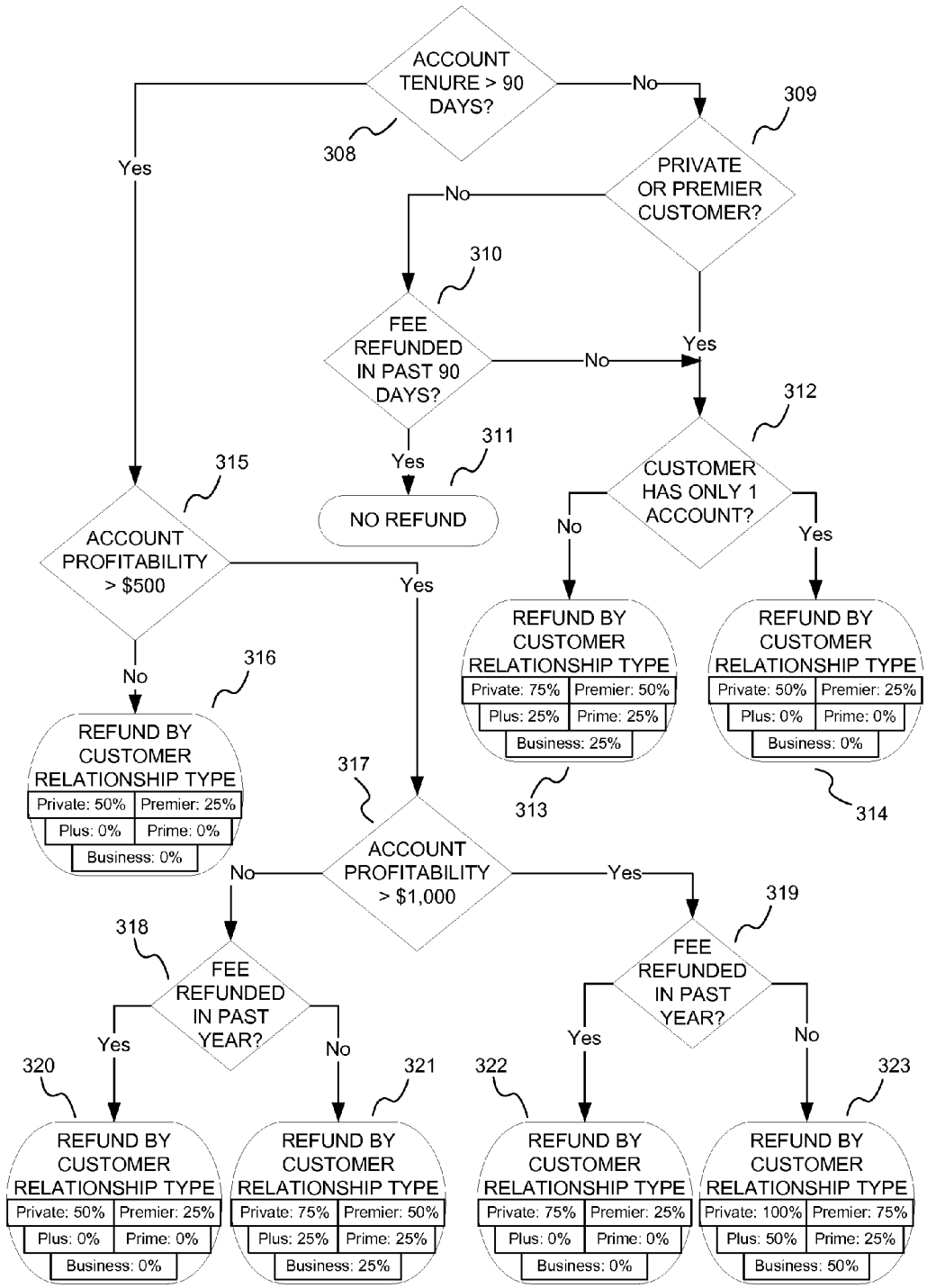

Referring to FIG. 3C, the refund software application executing on the server 101 has determined at this point that the customer's account was overdrawn by more than the nominal threshold amount on this NSF/OD occurrence, and that this account has been overdrawn for a few days in the last year. In step 308 the account tenure is retrieved or calculated from the account information in the database 121. If the account was recently opened compared to a threshold account tenure length (e.g, less than 90 days ago) (308: No), then control proceeds to step 309 when the customer relation type is found to be one or either Premier or Private (309: Yes), or Prime, Plus, or Business (309: No). If the customer is not a Premier or Private customer (309: Yes), and the customer has received a fee refund within a certain amount of time (e.g., the past 90 days) (310: Yes), then no refund will be offered to the customer. If the customer is a Premier or Private customer (309: Yes), or if the customer is a Prime, Plus, or Business customer that has not received a refund within the certain amount of time (310: No), then the number of accounts held by the customer is examined in step 312. If the customer has only one account with the bank (312: Yes), then the refund offer will be determined by customer relationship type using the refund percentage rates shown in result step 314. If the customer has more than one account with the bank (312: No), then the refund offer will be determined by customer relationship type using the refund percentage rates shown in result step 313. For step 312 in this example, the refund software application may consider a customer to have only one account if the customer has a single checking account, even if the customer has a debit and automatic teller machine (ATM) card for that account.

If the refund software application in this example determines that the account is older than the threshold account tenure length (308: Yes), then the logic of the software application will proceed to examine the account profitability in step 315. Account profitability statistics are commonly calculated and stored with account information (e.g., in database 121) for each account in the bank's system. Account profitability may be based on many factors such as the average daily balance of the account, the schedule of mailings associated with the account, and the previous fee and fee payment history of the account. Additionally, account profitability may also include profitability calculations for other accounts associated with the account holder, for example, the sum profitability of all of the account holder's accounts, or the sum profitability of all the accounts from the account holder's household. The resulting profitability measurement may be recalculated on a yearly basis or even more frequently, so that the account profitability information in the database 121 is consistently up to date. In step 315, if the yearly account profitability is less than a predetermined profitability threshold (e.g., $500) (315: No), then the fee refund offer will be determined based on the customer relationship type using the refund percentage rates shown in result step 316. If the yearly account profitability is greater than the profitability threshold (315: Yes) then the fee refund offer is determined based on the customer relationship type in result steps 320-323. As shown in FIG. 3C, the applicable result step 320-323 depends on whether or not the yearly account profitability is greater than a second profitability threshold (e.g., $1,000) (317: Yes), or less than the second threshold (317: No), and whether the customer has received a fee refund in a previous time window (e.g., within the past year) (steps 318 and 319).

Figure 3D:
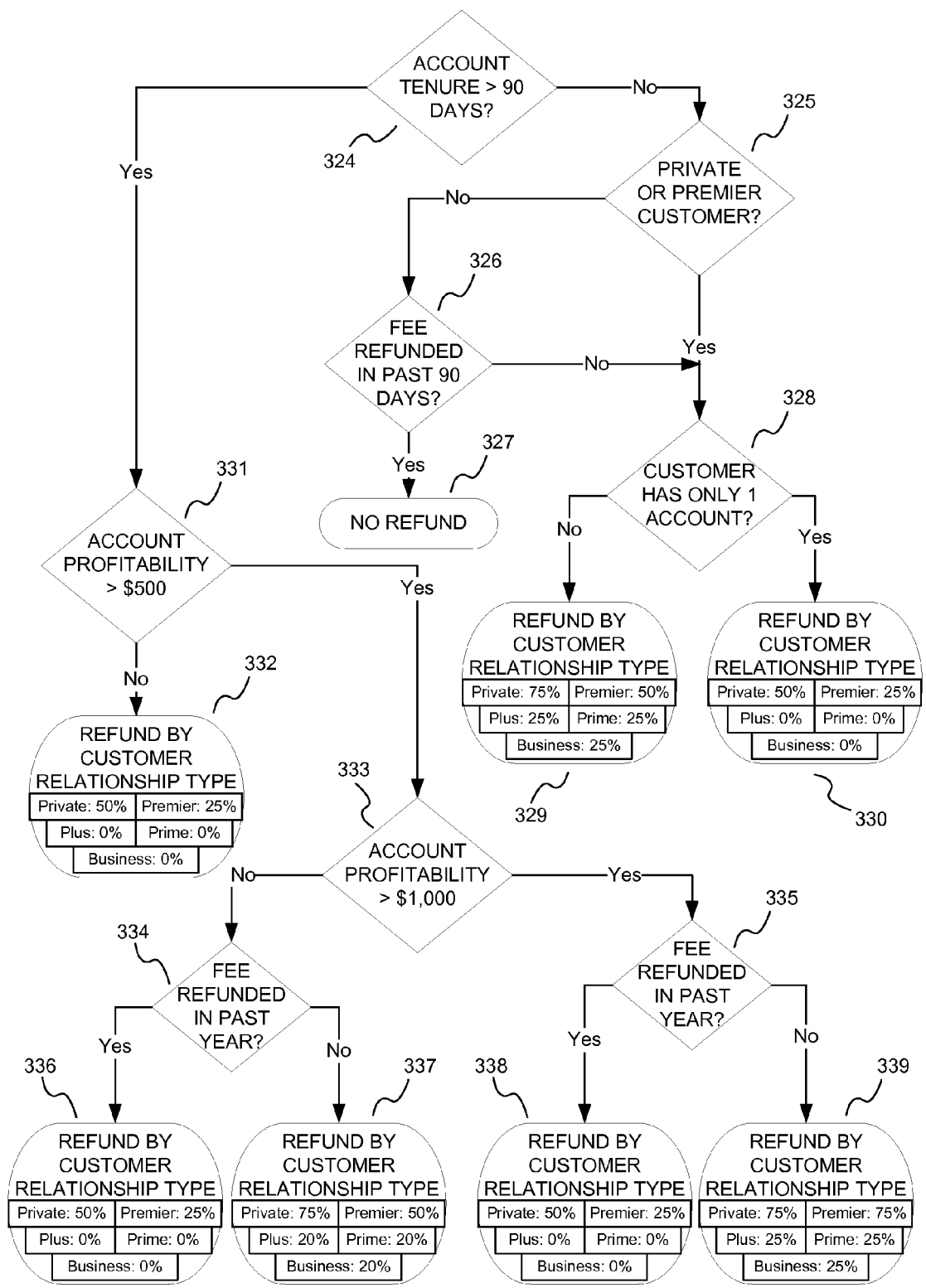

Referring to FIG. 3D, the logic steps 324-339 in this example will be executed if the refund software application executing on the server 101 has determined that the customer's account was overdrawn by more than the nominal threshold amount on this NSF/OD occurrence (302: No), and that this account has been overdrawn for at least several days in the last year (304: 5+). The logical steps 324-339 of FIG. 3D mirror the logical steps 308-323 of FIG. 3C. However, several of the suggested fee refund amounts in FIG. 3D are less than the corresponding refund amounts in FIG. 3C. Thus, in this example, the bank has implemented a uniform policy which offers lower fee refunds in many situations when the customer's account has been overdrawn for a longer time or on multiple occasions during the previous year. For instance, a Business customer requesting a fee refund for a long tenured and highly profitable account might be eligible for a 50% fee refund in step 323 if the account was in an overdrawn state 4 days in the past year. However, if the same account was overdrawn for 5 or more days in the past, the fee refund offer may automatically be dropped to 25% in step 339.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method for determining a fee refund amount at a specifically programmed refund computing device, comprising:
   receiving at a refund computing device a refund request relating to a fee charged to a first account, the refund request initiated by a first account holder associated with the first account;
      wherein the fee charged is a non-sufficient funds or overdrawn account fee charged by a financial institution to one or more account holders of the first account;
   retrieving account information associated with the first account;
      wherein the account information comprises at least an amount of time that the first account was in a non-sufficient funds or overdrawn state; retrieving account holder information associated with the first account;
   determining at the refund computing device a refund amount using a predetermined refund rule corresponding to the fee charged, wherein the determining is based on at least the fee charged, the account information, and the account holder information; and
   outputting via the refund computing device the refund amount, wherein the refund amount is used to offer a refund to the first account holder for the fee charged to the first account.

2. The method of claim 1, wherein the account holder information comprises the number of different accounts that the first account holder has at the financial institution.

3. The method of claim 1, wherein the refund amount is a partial refund calculated as a percentage of the fee charged.

4. The method of claim 1, wherein the account information comprises at least one of a calculation of profitability for the first account, an account type associated with the first account, and the tenure of the first account.

5. The method of claim 1, wherein the account information comprises a time and an amount for a previous fee refund associated with the first account.

6. The method of claim 1, further comprising identifying a second account holder associated with the first account holder, wherein determining the refund amount is further based on account information associated with a second account held by the second account holder.

7. The method of claim 6, wherein identifying the second account holder comprises executing a query for other account holders having an address in common with the first account holder.

8. One or more computer-readable media storing computer-executable instructions which, when executed on a computer system, perform a method for handling a refund request from a first customer, the method comprising:
   receiving a first refund request relating to a fee charged to a first account;
      wherein the fee charged is a non-sufficient funds or overdrawn account fee charged by a financial institution to one or more account holders of the first account;
   retrieving account information associated with the first account;

wherein the account information comprising at least an amount of time that the first account was in a non-sufficient funds or overdrawn state;

identifying one or more account holders associated with the first account;

retrieving account holder information associated with the one or more account holders;

determining a refund amount using a predetermined refund rule corresponding to the fee charged, wherein the determining is based on at least the fee charged, the account information, and the account holder information; and outputting the refund amount, wherein the refund amount is used to offer a refund to a first customer for the fee charged.

9. The computer-readable media of claim 8, wherein the method further comprises:

storing on the computer system the determined refund amount, a first request time corresponding to the received refund request, and a first request location associated with the received first refund request.

10. The computer-readable media of claim 9, wherein the method further comprises:

receiving a second refund request relating to the same fee charged to first account; and retrieving information corresponding to the stored determined refund amount, the request time, and the request location, wherein the retrieved information is used to offer a refund in response to the second refund request.

11. The computer-readable media of claim 10, wherein the second refund request is received from a second location different from the first request location.

12. The computer-readable media of claim 8, wherein the account holder information comprises the number of different accounts that the one or more account holders have at the financial institution.

13. The computer-readable media of claim 8, wherein the account information comprises at least one of a calculation of profitability for the first account, an account type associated with the first account, and the tenure of the first account.

14. The computer-readable media of claim 8, wherein the method further comprises:

identifying a different account holder having the same address as at least one of the account holders associated with the first account, wherein the determining the refund amount is further based on account information associated with a different account held by the different account holder.

15. An apparatus comprising:

a processor controlling at least some operations of the apparatus;

a memory storing computer executable instructions that, when executed by the processor, cause the apparatus to perform a method comprising:

receiving a refund request relating to a fee charged to a first account;

wherein the fee charged is a non-sufficient funds or overdrawn account fee charged by a financial institution to one or more account holders of the first account;

retrieving account information associated with the first account;

wherein the account information comprising at least an amount of time that the first account was in a non-sufficient funds or overdrawn state;

identifying a first customer with the first account;

retrieving customer information associated with the first customer; and determining a refund amount using a predetermined refund rule corresponding to the fee charged, wherein the determining is based on at least the fee charged, the account information, and the customer information.

16. The apparatus of claim 15, wherein the customer information comprises the number of different accounts that the first customer has at the financial institution.

17. The apparatus of claim 15, wherein the account information comprises at least one of a calculation of profitability for the first account, an account type associated with the first account, and the tenure of the first account.

18. The apparatus of claim 15, the method further comprising:

storing the determined refund amount, a first request time corresponding to the received refund request, and a first request location associated with the received refund request;

receiving a second refund request relating to the same fee charged to first account; and retrieving information corresponding to the stored determined refund amount, the first request time, and the first request location, wherein the retrieved information is used to offer a refund in response to the second refund request.

19. The apparatus of claim 15, the method further comprising:

identifying a second customer having an address in common with the first customer, wherein the determining the refund amount is further based on account information associated with a second account held by the second customer.

* * * * *